United States Patent [19]

Stockwell

[11] 4,026,983
[45] May 31, 1977

[54] METHOD OF PRODUCING SEAMLESS TUBULAR ARTICLES HAVING AN ARCUATE PORTION ALONG THE TUBULAR AXIS

[75] Inventor: David P. Stockwell, Farmington, Conn.

[73] Assignee: The Beaton & Corbin Manufacturing Co., Southington, Conn.

[22] Filed: July 9, 1975

[21] Appl. No.: 594,562

[52] U.S. Cl. .................................. 264/89; 264/99; 264/295; 425/DIG. 214
[51] Int. Cl.² .......................................... B29C 17/07
[58] Field of Search ................. 264/89, 90, 92, 94, 264/96–99, 296, 295; 425/DIG. 214, 326 B

[56] References Cited

UNITED STATES PATENTS

| 3,291,670 | 12/1966 | Usab .............................. 264/259 X |
| 3,325,862 | 6/1967 | Mehnert .......................... 264/98 X |
| 3,497,588 | 2/1970 | Williams et al. ............... 264/209 X |
| 3,608,017 | 9/1971 | Cines ............................... 264/94 X |
| 3,719,209 | 3/1973 | Rush et al. ....................... 138/177 |
| 3,767,747 | 10/1973 | Uhlig .............................. 264/98 X |

FOREIGN PATENTS OR APPLICATIONS

| 1,295,535 | 5/1962 | France ................................. 264/98 |
| 83,831 | 8/1971 | Germany .................. 425/DIG. 214 |

Primary Examiner—Jan H. Silbaugh
Attorney, Agent, or Firm—St. Onge Mayers Steward & Reens

[57] ABSTRACT

A method is disclosed for producing seamless tubular articles such as plumbing traps and the like which have an arcuate portion along their tubular axis. Mating die members are provided which, when clamped together, define a mold cavity configured to the external shape of the article to be formed. A tubular parison of heated thermoplastic resin is extruded and has an outside diameter less than the outside diameter of the article. While still pliable, the parison is bent to the general shape of the article and the die members are clamped about it with at least the bent portion inside the mold cavity. A blow molding duct is introduced into the parison and pressurized fluid is introduced through the duct to expand the parison outwardly into contact with the surfaces of the mold cavity. When the plastic has cooled sufficiently to rigidify, the die members are separated and the molded article is stripped from the mold. Apparatus for performing the method is also disclosed.

12 Claims, 14 Drawing Figures

METHOD OF PRODUCING SEAMLESS TUBULAR ARTICLES HAVING AN ARCUATE PORTION ALONG THE TUBULAR AXIS

BACKGROUND OF THE INVENTION

1. Field of the Invention

This invention relates to an improved method and apparatus for producing seamless tubular articles, from extrudable thermoplastic resin, that have an integral bend or arcuate portion along the longitudinal axis of the tube. The method and apparatus may be used with particular advantage to mold tubular articles which include a first arcuate section leading into another arcuate section having a different radius than or curved in a direction opposite to the first. For example, plumbing fixtures such as traps and related conduits are characterized by these arcuate configurations.

Moreover, since plastic plumbing fixtures offer certain advantages like better resistance to corrosion and reduced material and production costs, they are being installed instead of similar metal fixtures in many newly constructed buildings.

2. Description of the Prior Art

Plastic injection molding is one technique which has been used for making tubular plastic articles such as plumbing fixtures. However, injection molding can only be used practically to manufacture articles such as elbows and tees having open ends relatively close coupled to the curved or bent section, or to make other articles having a shape which permits easy withdrawal of a mold core that defines the tubular interior. An example of this technique is shown in U.S. Pat. No. 3,092,441 (Bilderbeek).

Fixtures such as J-shaped traps which include an arcuate section that leads into a straight section along the tubular axis are difficult to produce using injection molding techniques. An ordinary solid mold core becomes encased in the finished product since the bend in the article obstructs its removal. Sectional or articulated cores, such as those shown in U.S. Pat. Nos. 3,028,630 (Walker) and 3,200,023 (Cilker), have been proposed to solve this problem. However, the devices used in such methods are complex and the shapes of articles which may be fabricated by them are limited, making it impossible to meet established dimensioned standards of systems based on the prior metal counterparts.

Other proposals contemplate molding complex shapes from highly elastomeric plastics which may be greatly deformed to permit removal of the mold core. However, the finished product remains non-rigid and flexible and, accordingly, is difficult to connect with other fixtures in a liquid or gas-tight manner. Examples of flexible molded articles are shown in U.S. Pat. Nos. 2,484,031 (Havrenius) and 1,536,700 (Brucker).

Blow molding is another technique used in the past for making plastic articles. U.S. Pat. No. 3,291,670 (Usab) discloses a method where a closed parison is extruded vertically downward into an open mold. The mold is subsequently clamped about the parison which is blown outwardly to conform to the shape of the mold's inner surface. However, this technique is not well suited for molding articles having complex arcuate shapes because various parts of the parison which must reach both remote and nearby regions of the mold expand non-uniformly and create article walls of varying thicknesses.

U.S. Pat. No. 3,719,209 (Rush et al), assigned to the assignee of the present applicaton, discloses a method for manufacturing arcuate tubular articles of rigid plastic by extruding a large diameter parison between mating die members. The die members are clamped together folding the parison onto itself to be heat welded along a seam. A blow molding duct is introduced into the parison and die at a point adjacent one end of the article to be formed and fluid, under pressure, is introduced through the duct to force the parison wall into contact with the mold cavity surface. However, a weakness can result at the seam. Further, substantial amounts of flash result which must be trimmed and recycled to again be molded.

Other blow molding techniques are disclosed in U.S. Pat. Nos. 3,452,125 (Schurman et al), 3,412,187 (Fogelberg et al), 3,300,556 (Battenfield et al), 3,100,317 (Perry), 2,983,961 (Titterton et al), 2,975,472 (Colombo) and 2,897,840 (Roberts et al).

SUMMARY OF THE INVENTION

In a preferred embodiment, described below in detail, the method of the present inventon utilizes an improved blow molding technique for producing tubular articles which include an arcuate section that leads into at least one straight section. This method is practiced by providing a split molding die which comprises complementary die members that are separable along an axial plane of the article coincident with the axial plane of its arcuate portion. The die members have mold cavity portions which cooperate, when the members are clamped together, to define a single mold cavity having the same external shape as the article to be formed.

A tubular parison of a heated thermoplastic resin is extruded downwardly from an extruder head having an annular extrusion die that is dimensioned so that the parison has an outside tubular diameter somewhat less than the tubular diameter of the article to be formed. The leading end of the parison is pinched together by a suitable clamp as it advances, and the clamp may then be transversely translated or lifted in an arcuate path, as the extrusion of the parison continues, causing the intermediate portion of the parison to assume a looped or arcuate shape. Generally this is done without use of bending guides at the intermediate region, although such guides may sometimes be used. The molding die halves are then moved into flanking positon on respective opposite sides of the looped portion and closed to encase the bent portion of the parison in the die cavity. The parison is severed and the closed molding die shifted to a position free of interference with the continuously extruded parison. A blow pipe is introduced into the severed parison section in the mold and light pressure applied to expand the wall of the parison outwardly to conform with the inner surface of the mold cavity. After the thermoplastic resin has cooled sufficiently to rigidify, the die members are separated and the molded article is stripped from the mold cavity. The cycle is then repeated.

After the molded article has been removed from the mold and cooled sufficiently to handle, any flash which remains may be stripped away and the ends of the article may be trimmed.

The method of the present invention can be used to cheaply and efficiently produce tubular articles having an arcuate bend connected to adjoining sections of such configuration as to be impossible to mold using an internal core. Further, these articles may be molded with integral threaded sections, as well as with sections having varying wall thicknesses, in certain areas along the axis of the tube. The method makes possible the practical commercial producton of plastic plumbing J-bends, waste bends and similar arcuate tubular fittings, having dimensional identity with the corresponding metal components. The method provides several advantages over prior art methods of molding such articles. Since the initially extruded parison has a diameter smaller than the finished product and is completely accepted into the mold cavity, the finished article is produced without a seam. Further, since the parison is not folded back on itself and heat welded together at any location, much less flash is produced. Accordingly, a large amount of plastic material recycling is eliminated, as is a potential for seam fracture.

The die match at the die member interface is likewise not as critical as previously needed in blow molding as described in U.S. Pat. No. 3,719,209, since a seam weld is not involved and a relatively low blowing pressure will suffice to get full conformation of the parison with the mold cavity. Thus, deformation of the plastic parison material into gaps between slightly mis-matched die members is reduced.

Accordingly, it is an object of the present invention to provide a novel, efficient and economical method for producing seamless thermoplastic tubular articles having at least one arcuate portion along the tubular axis. Other objects, aspects, and advantages of the present invention will be pointed out in, or will be understood from, the following detailed description considered in conjunction with the following drawings.

DESCRIPTION OF THE PREFERRED EMBODIMENT

Figure 1:
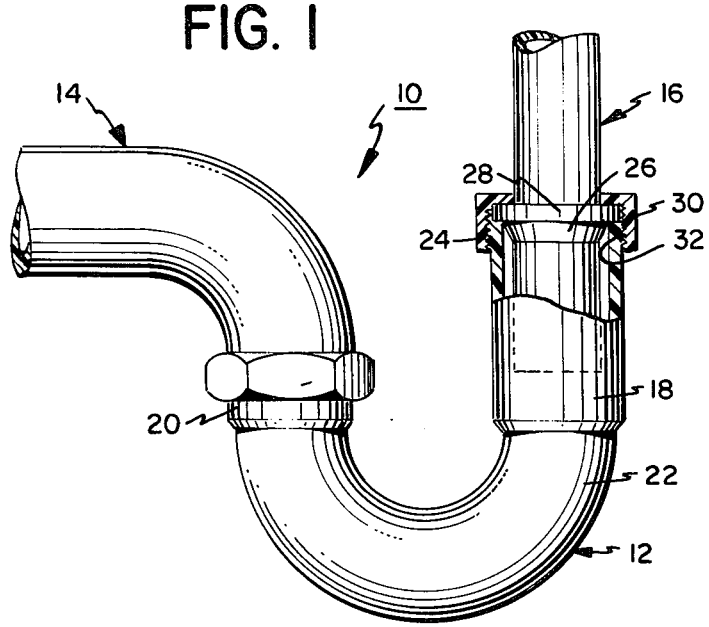
FIG. 1 is a side elevational view of a short section of plumbing waste duct which includes a waste bend and trap of plastic that may be produced by the method of the present invention. In the drawing, a portion of the trap is shown broken away at one end to illustrate details of one of its threaded portions.

FIG. 1 illustrates a section of a plumbing waste duct 10 which comprises a J-shaped trap 12 connected at one end to a waste bend 14 and at the other end to an extension tube or tail piece 16. All three duct members can be formed of molded plastic tubing. The method of the present invention has particular utility for molding duct pieces such as the J-shaped trap 12 and the waste bend 14. In the interest of simplicity, the method will be explained with reference to manufacture of the J-shaped trap 12.

Trap 12 includes two straight sections or runs 18 and 20 that are integrally formed with and interconnected by an arcuate section 22. Runs 18 and 20 have a slightly larger internal diameter than arcuate section 22 so that they may telescopically receive the coupling ends of tail piece 16 and waste bend 14, respectively. In addition, each of the runs is formed at its free end with external threads 24 integrally molded into the wall of the tubing. Each end is also internally beveled to form an annular seat 26 for receiving an annular frustoconical gasket 28 to seal against the seat 26. A gland nut 30, internally threaded at 32 to mate with external threads 24, compresses the frustoconical gasket against the seating surface and circumferentially of the respective waste bend 14 and tailpiece 16 to form a liquid and gas-tight joint.

Figure 2:
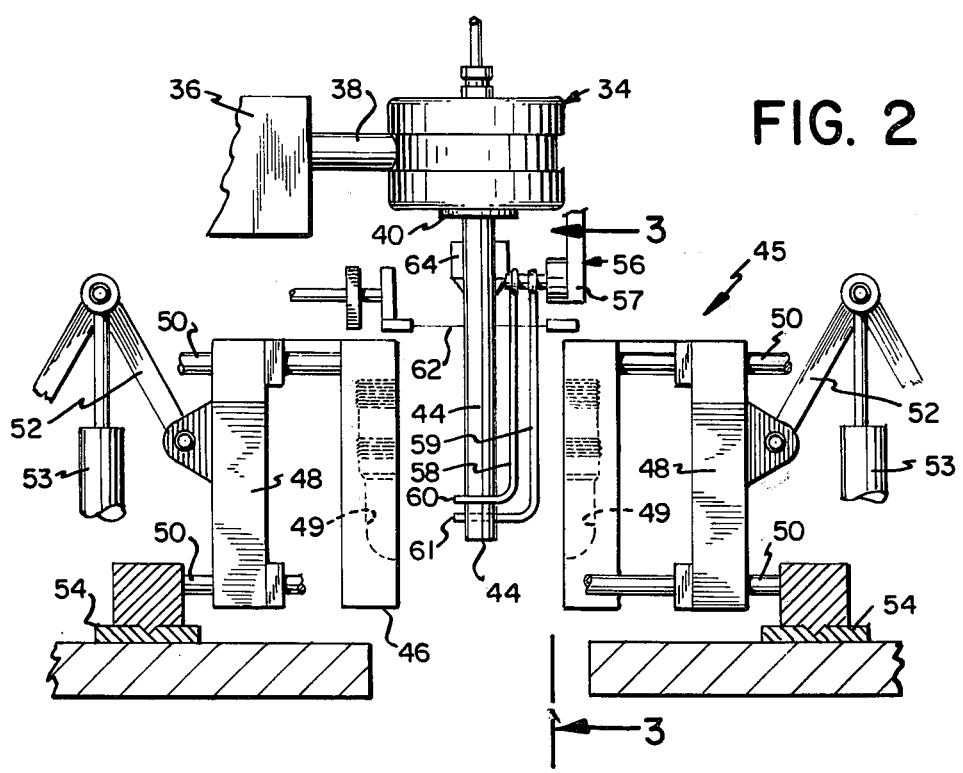
FIG. 2 is a fragmentary end elevational view of molding equipment, shown with complementary die members in parted position, suitable for practicing the method of the present invention.

A suitable apparatus for practicing the method of the present invention is illustrated in FIG. 2. This apparatus includes an extrusion head 34 which is connected to a resin hopper or storage bin 36 by a heated feeder tube 38. Beads or chips of plastic resin are fed to extrusion head 34 by an auger 35 (FIG. 12) in feeder tube 38. The resin is heated in the storage bin and feeder tube so that it is in a plastic or semi-liquid condition when it reaches extruder head 34.

The plastic resin is extruded through a suitable annular die 40 in head 34 (FIGS. 12, 13), having a central mandrel 42, to form a pliable depending tubular parison 44. This parison is extruded continuously, generally at the rate of approximately 2 to 3 feet per minute. The extrusion die 40 is dimensioned so that parison 44 has an outside diameter which is slightly smaller than the diameter of the tubular article to be formed.

Figure 5:
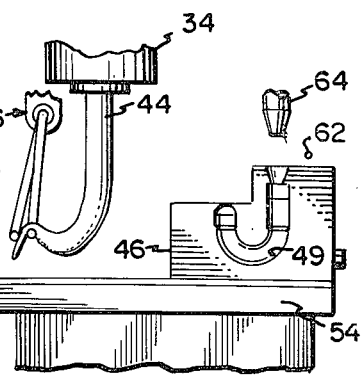
Figure 6:
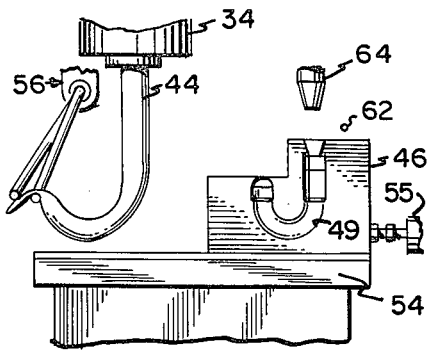
Figure 7:
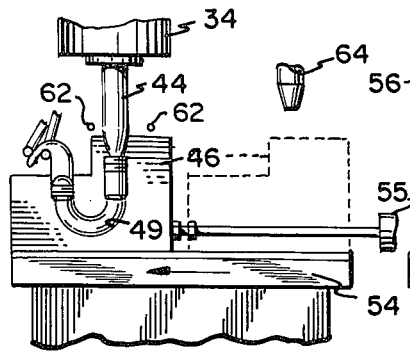
Figure 8:
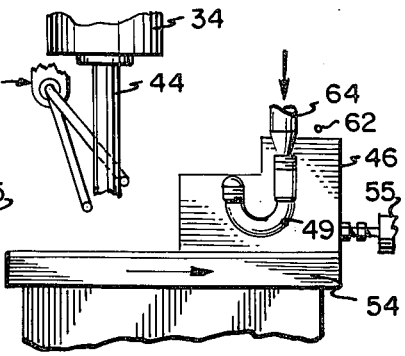
Figure 10:
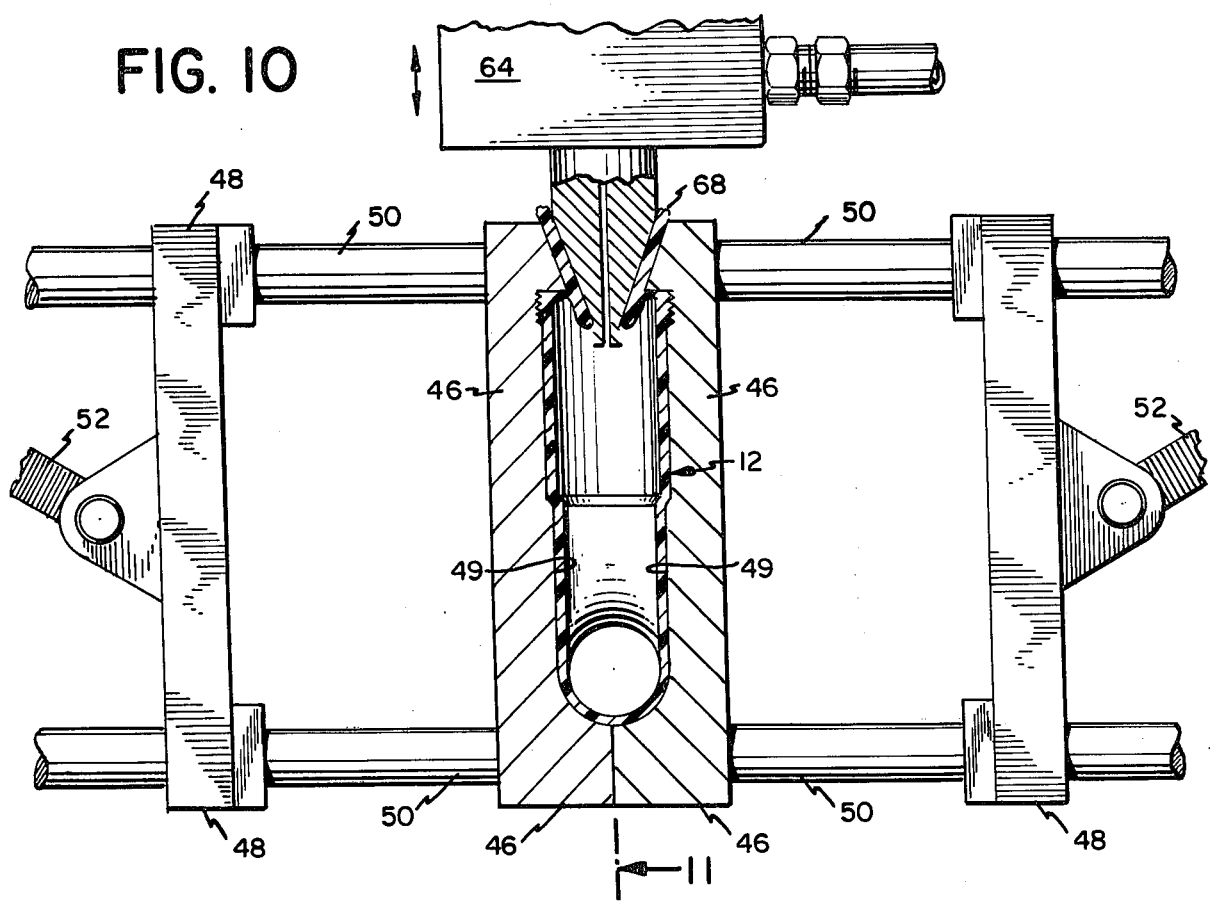
FIG. 10 is an end elevational view, partly in cross-section, showing the die members in their closed position, and the blow pipe inserted to inflate the enclosed pliable parison.

As shown in FIG. 2 and schematically in FIGS. 3 through 8, extrusion head 34 is positioned above a partable blow-molding die, indicated generally at 45, comprising mating die halves 46 carried by back-up plates 48. Each die half is formed in its abutting face with complementary cavities 49 to provide the desired external mold configuration for the finished product, in this case the J-bend. Each of the dies 46 and its respective back-up plate is slidably mounted on support rails 50, and toggle links 52 are coupled to plates 48 by hydraulic actuators 53 to reciprocate die members 46 between open or parted position (FIG. 2) and closed, facially abutting position (FIG. 10). Extrusion head 34 is so positioned as to cause the extruded parison to hang in the parting plane of dies 46. As further shown in FIGS. 3 to 8, the blow molding die assembly 45 is mounted on ways 54 for translational movement parallel to the parting plane. At a first station, molding assembly 45 is positioned so that it is laterally off-set of the depending parison and the parison can be extruded without interference with the molding die members 46, whether open or closed. This is illustrated in FIGS. 3 through 6 and 8. At a second station to which assembly 45 is movable on ways 54, the die members 46 in open position flank the depending parison so that the portion of the mold cavity defining the tailpiece run 18 is axially coincident with the axis of extrusion die 40. This condition is represented in FIG. 7.

The molding apparatus is provided with tongs 56 (see FIG. 9) which are pivoted in a suitable bearing support 57 for swinging movement from a substantially depending position parallel to and adjacent the extruded parison to a substantially horizontal position. Tongs 56 comprise separately articulable legs 58, 59 having L-shaped feet 60, 61 at their free ends. The feet cooperate to form a clamp for pinching the parison between them, for a purpose to be presently explained. In addition, the apparatus includes a parison severing device 62, such as an electrically heated resistance wire, that is mounted horizontally for reciprocation between molding die 45 and extrusion die 40 (FIG. 2). Also provided is a vertically reciprocable blow pipe assembly 64 arranged to be moved into and out of the upper end of the mold cavity forming the tailpiece run 18 of the finished J-bend.

Figure 3:
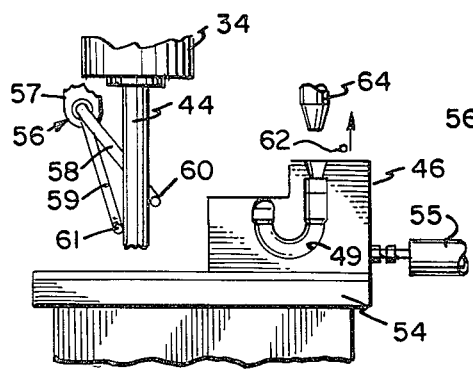
FIGS. 3 through 8 are schematic side elevational views illustrating successive stages of parison bending and blow mold die positioning, taken on plane 3—3 in FIG. 2.
Figure 4:
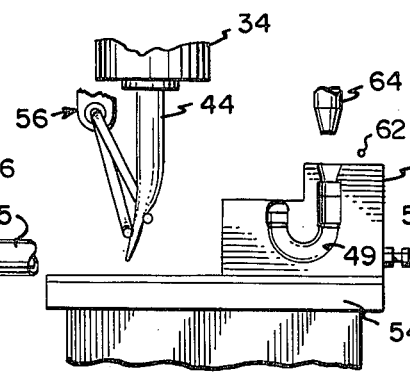
Figure 9:
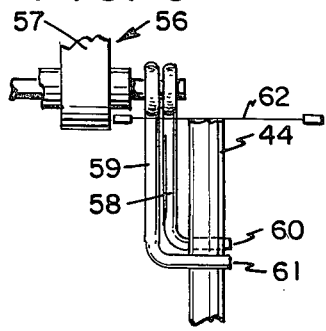
FIG. 9 is a fragmentary view of parison clamping tongs.
Figure 11:
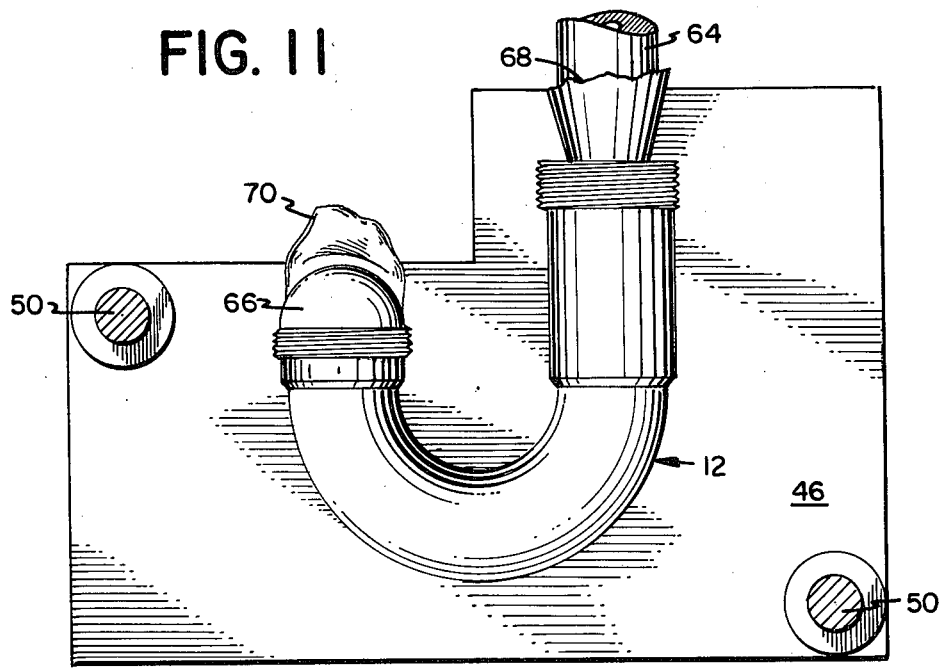
FIG. 11 is an elevational view of the face of one die member and of the molded tubular article therein prior to being stripped from the mold cavity and trimmed.

With reference again to FIGS. 3–8, the sequence of operations during a molding cycle is schematically shown. FIG. 3 represents the condition at the start of a cycle, wherein parison 44 is extended progressively to hang down adjacent the front face (left face as seen in the figure) of the molding die assembly 45. At this point, legs 58, 59 of tongs 56 are separated slightly so that the end of the parison passes down between the respective feet 60, 61 (FIG. 9). As the extrusion of the parison continues, leg 58 is pivoted counterclockwise (as illustrated) to cause its foot 60 to meet foot 61 of leg 59, thus pinching parison 44 between them to clamp it closed (see FIG. 4). Legs 58, 59 continue to pivot together, in timed relation to the rate of parison extrusion, with the closed end of the parison clamped between feet 60, 61, thus lifting that end of the parison along an arc to form an depending loop in the parison (FIGS. 5, 6). The length of legs 58, 59 is so selected that the radius of the parison loop substantially coincides with the radius of the J-bend arcuate cavity portions in die members 46. These latter are in parted condition at this point and are moved from the initial station into flanking position, relative to the bent parison, by translation of the entire molding die assembly 45 to the left (as here viewed). The operations are timed so that at this point there is substantial axial coincidence of the parison loop and the mold cavities of the die, whereupon the die is closed by the previously mentioned toggle links 52 to enclose the still pliable parison in the mold cavity (see FIG. 7). Next, the hot-wire severing device 62 is actuated to transverse it horizontally to the left to cut off the parison, thus freeing the molding die assembly 45 for return to its original station (FIG. 8) with the severed section of the still semi-pliable parison. Blow pipe 64 is moved down into an opening of the mold cavity (see FIGS. 8 and 10) to penetrate the severed end of the parison in the mold and establish pressure communication with the interior of the enclosed severed parison section. Air or other fluid pressure is then introduced through the blow pipe to expand the parison wall against the mold cavity to effect complete conformance of the parison therewith. As shown in FIG. 11, the molding die cavity is closed at the end of the shorter run of the J-bend, the closure being in the form of a hemisphere which produces a similar closed end 66 on the molded product. When the plastic has solidified sufficiently in the mold to achieve reasonable self-support, the die members 46 are parted, leaving the semi-finish product still engaged by the blow pipe 64 which thus helps to strip the product from the die members. The product is finally stripped from the blow pipe when this is retracted vertically upward. The cycle is then repeated for the next section of parison which has meanwhile been issuing from head 34 and is ready to be picked up by tongs 56.

The product, on being stripped from the molding dies, is best shown in FIG. 11. As will be seen, there are two small sections 68, 70 of waste or flash, one at each end of the J-bend, which must be cut off. This is conveniently done manually or automatically by a butterfly cutter (not shown) or similar tool to complete the manufacturing operations. It will be noted, however, that there is no flash along the wall intermediate the ends of the bend. The article thus formed by this method is, accordingly, free of all longitudinal seams or plastic weld joints which might structurally weaken the product.

Figure 12:
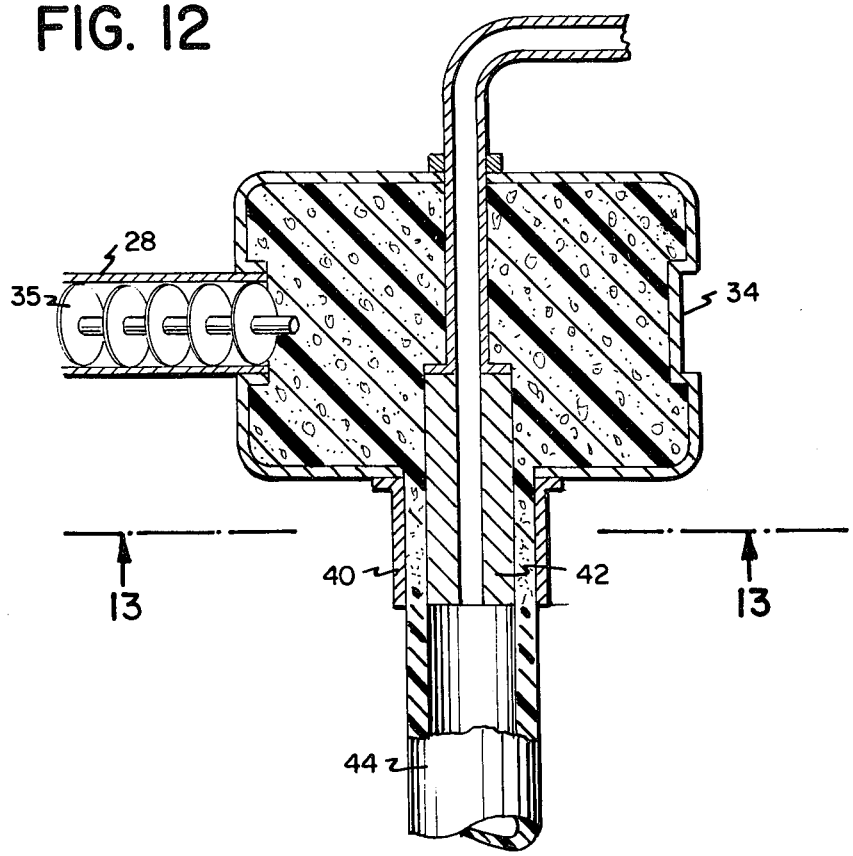
FIG. 12 is a cross-sectional view of the extrusion head showing one arrangement for partially inflating the parison to prevent its collapse during extrusion.
Figure 13:
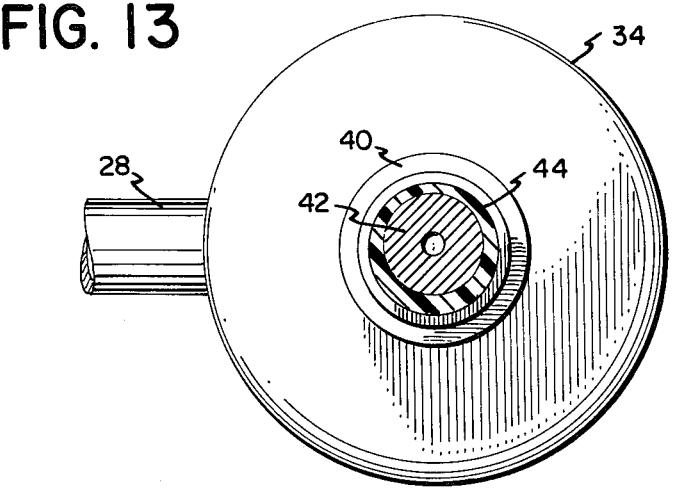
FIG. 13 is a bottom view of this extrusion head taken from plane 13—13 in FIG. 12, illustrating one method of varying the wall thickness of the parison about its circumference.

FIGS. 12 and 13 illustrate the extrusion head 34 in some greater detail. It may be desirable to introduce fluid at low pressure into the parison while it is being extruded to prevent collapse during the bending process. This may be accomplished by providing the mandrel 42 with a conduit 43 connected through extrusion head 34 to a source of pressurized fluid.

In addition, it may be desirable to increase the wall thickness of the molded article in certain areas, such as the threaded ends. This may be accomplished by "burping," i.e. periodically suddenly increasing the momentary feed rate of the semi-liquid resin material through die 40 at desired points along the length of the resulting parison. Alternatively, an axially adjustable tapered mandrel or die may be employed to vary the wall thickness by changing the size of the annular orifice opening, thus producing an equivalent result.

The bending operation described above tends to increase the wall thickness of the molded tubular article on the inside radius of the arcuate section and decrease wall thickness on the outside radius. This nonuniform wall thickness condition may be corrected by positioning mandrel 42 off-center with respect to die 40, as shown in FIG. 13. Accordingly, one side of the extruded parison 44 has greater initial wall thickness than the opposite side. The molding apparatus is then arranged so that this initially thicker longitudinally extending region becomes the outside radius of the arcuate article section, thus compensating in the final product for the stretching produced during bending.

Figure 14:
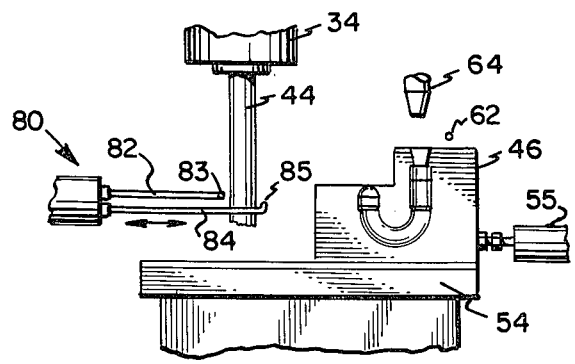
FIG. 14 is a partly schematic view, similar to FIGS. 3 to 8, of a modified parison manipulating arrangement.

An alternative to the articulatable tong arrangement described above for manipulating the depending end of the extruded parison is shown in FIG. 14. In this instance the manipulating device 80 comprises a pair of horizontally reciprocable arms 82, 84 having angled clamping hands 83, 85, respectively, which may be brought together by relative longitudinal translation of either or both of arms 82, 84, producing the desired clamping of the parison. As the extrusion of the parison continues, the arms are simultaneously withdrawn in timed relation to the extrusion rate, thus producing the depending loop or bend, as previously described.

Although a specific embodiment of the method of the present invention has been described above in some detail, it will be understood that this is for purposes of illustration. Modifications of the described method utilizing the inventive concept will be apparent to those skilled in the art, in order to adapt it to specific applications. For example, for some conditions of forming bends in the extruded parison, it may be desirable to include temporary formers around which the parison is drawn by the tongs during the bending operation. Such formers can be recessed in the die faces and moved outwardly therefrom when the die halves are parted and stationed in flanking relation the looped parison. Such formers may be used to assist in conforming the bend of the parison to the mold cavity. As the molding die is closed, these formers are retracted back into the die members. In general however it has been found necessary to employ such formers in the production of standard J-bends as above described.

What is claimed is:

1. A method for producing a seamless tubular article having an arcuate portion along its tubular axis that leads into at least one straight portion, said method comprising the steps of:

providing partable mating die members having mold cavity portions which cooperate, when said die members are closed, to define a cavity having an arcuate section that leads into at least one straight section configured to the external shape of the article to be formed:

advancing downwardly a depending tubular length of pliable thermoplastic resin having an outside diameter slightly less than the outside diameter of the article to be formed;

while said tubular parison continues advancing downwardly, causing relative movement between the depending end of and the remainder of said tubular length while still pliable, first in a direction lateral to the tubular axis of said length as downwardly advanced and then in an upward direction generally opposed to the tubular axis of said length as advanced to cause a portion of said tubular length to sag into a loop that has the general shape of the arcuate portion of the article being formed but to cause a straight portion of said tubular length, having the general shape of the straight portion of the article being formed, into which the arcuate tubular length portion leads, to remain;

closing said die members about said tubular length with said arcuate and said straight portion lying inside said mold cavity;

introducing a blow molding duct into said tubular length to provide communication with the interior thereof;

introducing fluid under pressure through said duct to force the wall of said tubular length outwardly into contact with the surface of said mold cavity;

separating said die members after the plastic has cooled sufficiently to rigidify; and stripping the molded tubular article from said die cavity portions.

2. A method for producing a seamless tubular article having an arcuate portion along its tubular axis that leads into at least one straight portion, said method comprising the steps of:

providing partable mating die members having mold cavity portions which cooperate, when said die members are closed, to define a cavity having an arcuate section that leads into at least one straight section configured to the external shape of the article to be formed;

downwardly extruding a length of tubular parison of heated pliable thermoplastic resin having an outside diameter slightly less than the outside diameter of the article to be formed; while the tubular parison continues to be extruded downwardly, causing relative movement between the depending end of and the remainder of said tubular parison while still pliable, first in a direction lateral to the tubular axis of said parison as downwardly extruded and then in an upward direction generally opposed to the tubular axis of said parison as extruded to cause a portion of said parison to sag into a loop that has the general shape of the arcuate portion of the article being formed, but to cause a straight portion of said tubular parison, having the general shape of the straight portion of the article being formed and into which the arcuate parison portion leads, to remain;

closing said die members about said tubular parison with said arcuate and said straight portions lying inside said mold cavity; p1 introducing a blow molding duct into said parison to provide communication with the interior thereof; p1 introducing fluid under pressure through said duct to force the parison wall outwardly into contact with the surface of said mold cavity;

separating said die members after the plastic has cooled sufficiently to rigidify; and stripping the molded tubular article from said die cavity portions.

3. The method for producing a tubular article having an arcuate portion along its tubular axis as claimed in claim 2, further comprising the steps of:

closing a first end of said tubular parison, and thereafter introducing said blow molding duct into said tubular parison while in said mold.

4. The method for producing a tubular article having an arcuate portion along its tubular axis as claimed in claim 3, wherein said first parison end is the depending end and wherein said method further comprises the step of:

continuously extruding said parison;

severing said parison, after sufficient length has been extruded to form said tubular article and this has been enclosed in said molding die, to form a trailing end of the severed length and introducing said blow molding duct into said trailing end.

5. The method for producing a tubular article having an arcuate portion along its tubular axis as claimed in claim 2, wherein said mating die members are separable along an axial plane of the article coincident with the axial plane of its arcuate portion, and wherein said die members are also translationally movable in a direction parallel to said plane between first and second stations, whereby at one of said stations said die members are offset from said parison so as not to interfere with its extrusion and bending, while at the other of said stations said die members are in flanking relation to said parison.

6. The method for producing a tubular article having arcuate portion along its tubular axis as claimed in claim 2, further comprising the step of:

selectively increasing extrusion pressure on said thermoplastic resin as it is extruded to increase the amount of resin extruded at locations on said parison where increased wall thickness is desired.

7. The method for producing a tubular article having arcuate portion along its tubular axis as claimed in claim 2, further comprising the step of:

introducing pressure into the interior of said parison during extrusion to prevent collapse of said parison during the bending thereof.

8. The method for producing a tubular article having an arcuate portion along its tubular axis as claimed in claim 2, wherein said parison is extruded from a die having a hole defining the outside shape of said parison and a mandrel defining the inside shape of said parison, said method further comprising the step of:

shifting said mandrel relative to said hole to change the parison wall thickness along the length of the parison.

9. The method as defined in claim 8, which includes shifting said mandrel eccentrically of said hole in said die to change the parison wall thickness circumferentially of the parison.

10. A method of producing a seamless tubular article having an arcuate portion along its tubular axis that leads into at least one straight portion, said method comprising the steps of:

providing shiftable mating die members partable in a direction perpendicular to the direction of shift and having mold cavity portions which cooperate when said die members are clamped together to define a mold cavity having an arcuate section that leads into at least one straight section configured to the external shape of the article to be formed;

downwardly extruding a depending tubular parison of heated thermoplastic resin having an outside diameter slightly less than the outside diameter of the article to be formed;

grasping the leading end of said parison while it advances downwardly and thereby causing relative movement between the depending end of and the remainder of said tubular parison in the parting plane of said die members while said parison is still pliable first in a direction lateral to the tubular axis of said parison as downwardly extruded and then in an upward direction generally opposed to the tubular axis of said parison as extruded to cause said parison to sag into a loop intermediate its length into the general shape of the arcuate portion of the article to be formed and to cause it to have a straight portion having the general shape of the straight portion of the article to be formed into which the arcuate parison portion leads;

shifting said die members while parted to a position flanking the arcuate and straight portions of said parison and then closing said members with said arcuate and straight parison portions lying inside said mold cavity;

severing said enclosed arcuate and straight portions from the remainder of the parison and shifting said closed die members away from the region where it would interfere with the continued extrusion of the remainder of the parison;

introducing a blow molding duct into the severed end of the parison in said mold cavity to provide fluid communication with the parison interior;

introducing fluid under pressure through said duct to force the parison walls outwardly into contact with the surface of said mold cavity;

parting said die members after the plastic has cooled sufficiently to rigidify; and stripping the molded tubular article from said die members.

11. The method of producing a seamless tubular article having an arcuate portion along its tubular axis as claimed in claim 10, wherein the loop forming operation comprises the steps of:

pivoting said closed parison end on a radius about a fixed point to cause said parison to loop downwardly intermediate its length to form the arcuate portion prior to clamping said die members together about said loop portion.

12. The method as defined in claim 10, wherein the loop forming operation comprises the steps of:

horizontally moving said closed parison end at a rate correlated to the rate of parison extrusion to cause said parison to loop downwardly intermediate its length to form the arcuate portion prior to clamping said die members together about said loop portion.

* * * * *